United States Patent
Holmes et al.

(10) Patent No.: US 6,739,428 B1
(45) Date of Patent: May 25, 2004

(54) PORTABLE DEER STAND

(75) Inventors: Curtis R. Holmes, Hawkins, TX (US); Troy D. Love, Hawkins, TX (US); Shawn O. Schrecengost, Gilmer, TX (US)

(73) Assignee: Mobile Hunting Technologies, LLC, Gilmer, TX (US)

( * ) Notice: Subject to any disclaimer, the term of this patent is extended or adjusted under 35 U.S.C. 154(b) by 0 days.

(21) Appl. No.: 10/139,970

(22) Filed: May 6, 2002

(51) Int. Cl.$^7$ .............................................. A01M 31/00
(52) U.S. Cl. ....................................................... 182/127
(58) Field of Search ............................... 182/127, 63.1, 182/113, 115, 129

(56) References Cited

U.S. PATENT DOCUMENTS

| | | | |
|---|---|---|---|
| 3,882,964 A | * | 5/1975 | Schellenberg .............. 182/69.4 |
| 4,614,252 A | * | 9/1986 | Tarner ......................... 182/116 |
| 4,696,374 A | | 9/1987 | Hale |
| 4,787,477 A | | 11/1988 | Dolan |
| 4,800,986 A | | 1/1989 | Hayes, III |
| 5,042,614 A | | 8/1991 | Rainey |
| 5,295,555 A | * | 3/1994 | Strange ....................... 182/2.5 |
| 5,297,844 A | | 3/1994 | Haustein |
| 5,409,081 A | | 4/1995 | Reeves |
| 5,634,529 A | * | 6/1997 | Nguyen et al. ............. 182/113 |
| 6,039,150 A | * | 3/2000 | Palmer ........................ 182/113 |
| 2002/0134620 A1 | * | 9/2002 | Meyer ......................... 182/127 |
| 2002/0157899 A1 | * | 10/2002 | Smith ......................... 182/63.1 |

* cited by examiner

Primary Examiner—Alvin Chin-Shue

(57) ABSTRACT

A portable hunting device for elevating a hunter wherein the device can be transported to and from a hunting site on a transport vehicle. When fully assembled, the hunting platform is supported by a ladder and at least two support legs. During transport the hunting platform is lowered, the ladder is folded and the support legs are removed and stored in a storage position so that the device is compact for safe transportation. Upon arrival at the desired location, the ladder is extended from a folded position to an extended position and the legs are removed from the storage position and are inserted into the leg guides where the legs are locked into position to prevent separation. A cable is connected from a hand-operated winch to the ladder so that as the winch is rotated, the ladder is rotated and the platform is raised from the transport position to the hunting position.

9 Claims, 5 Drawing Sheets

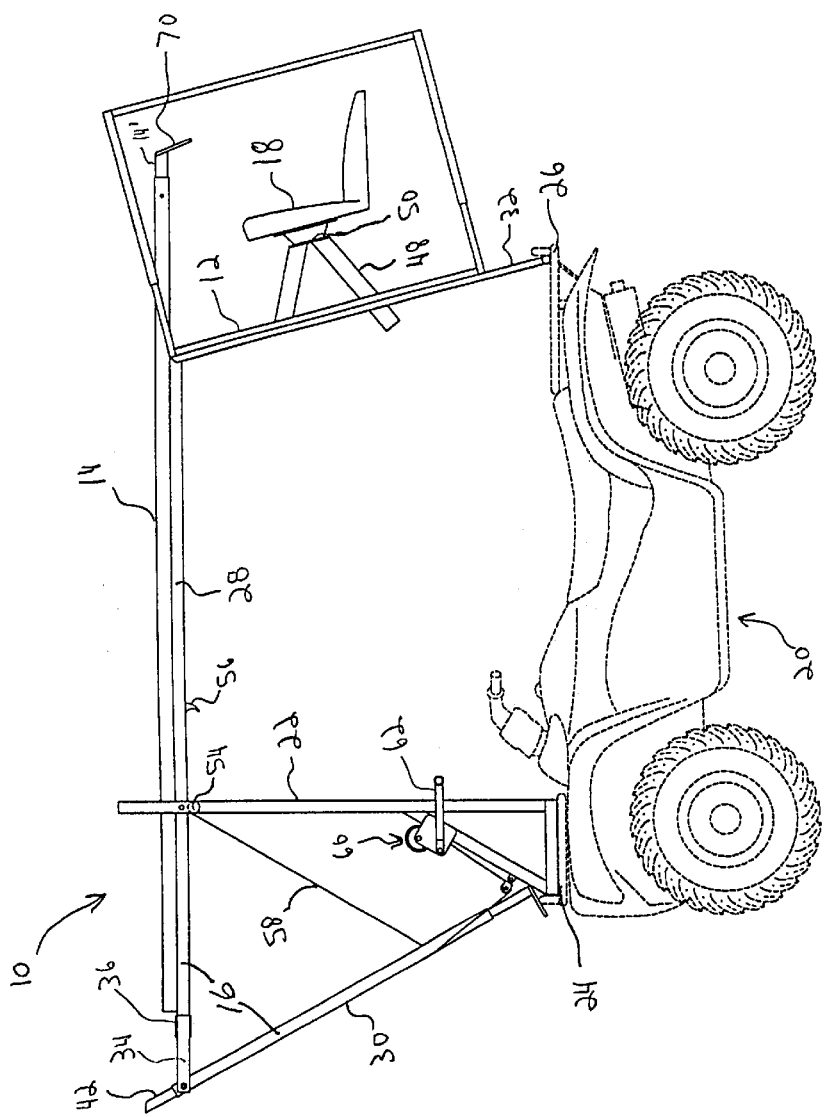
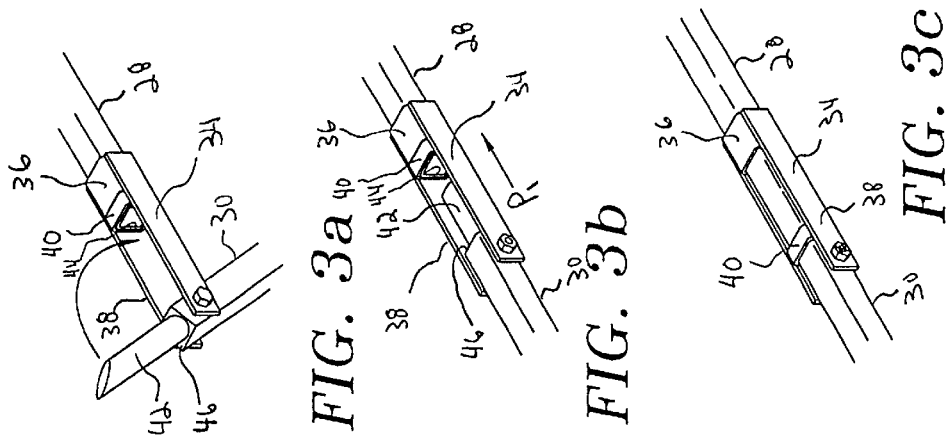

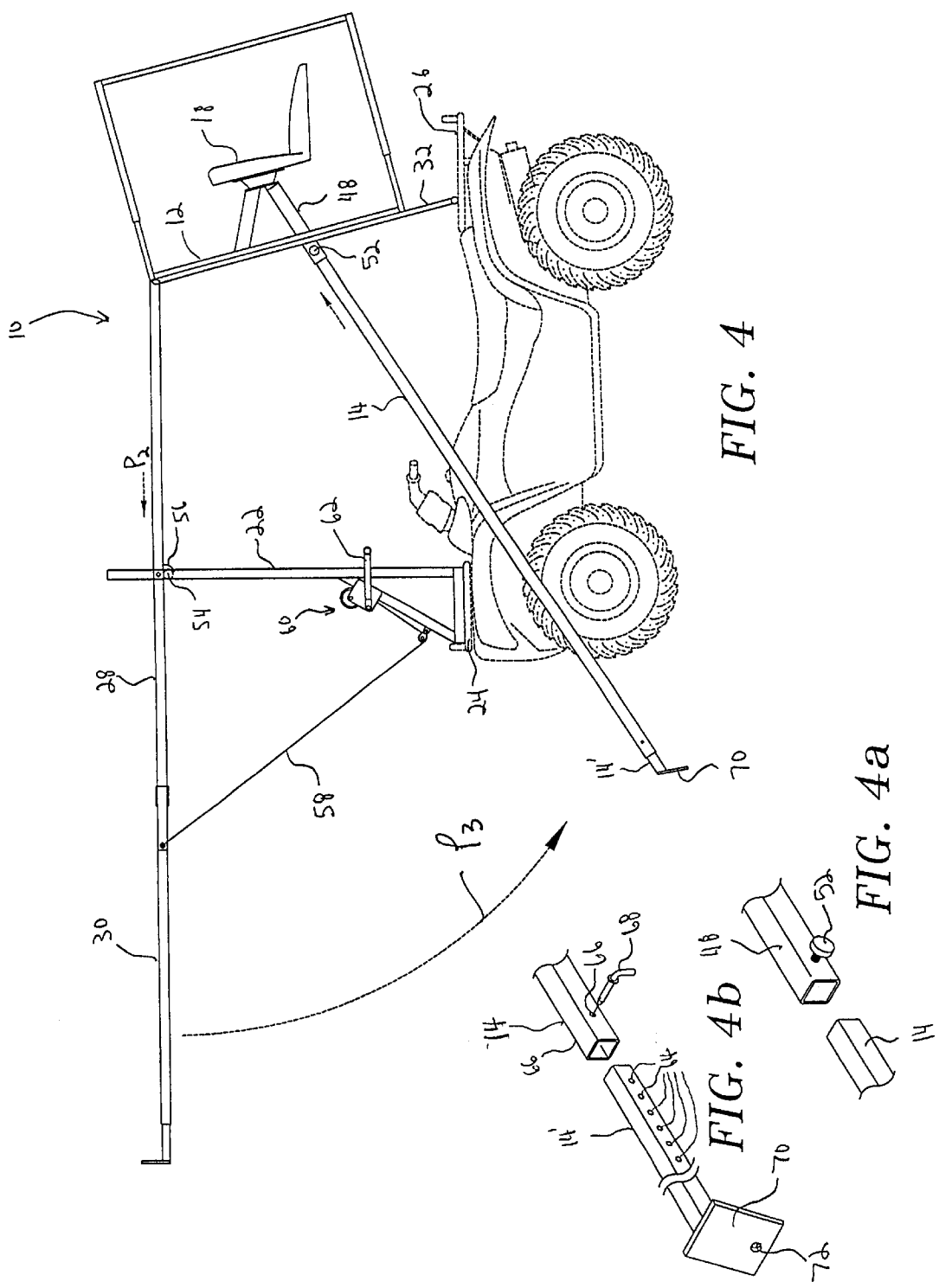

PORTABLE DEER STAND

TECHNICAL FIELD OF THE INVENTION

The present invention relates to a portable deer stand for use when hunting. More particularly, the present invention is a portable deer stand adapted to be mounted to a transport vehicle and transported to and from a hunting site. The deer stand includes a foldable ladder and adjustable legs to support the stand once it is raised from the transport position to the hunting position.

BACKGROUND OF THE INVENTION

Commonly used by hunters, deer stands provide an elevated platform for hunters while waiting for a deer to pass the area surrounding the hunter. In most cases, these stands are located in remote areas to avoid noise and located in deer habitats. Oftentimes, these remote areas have rugged terrains, are wooded and are far removed from any road or trail; thus, it becomes difficult to transport and assemble the deer stand at the hunting location. Disassembled deer stands are generally transported for permanent assembly at the site where the hunter wishes hunt. Assembly at the site has several disadvantages as it can be time consuming and troublesome for those not having the proper equipment to assemble such structures. Furthermore, if the stand is permanently erected at the hunting area, continued exposure to weather conditions can cause rust or deterioration at a significantly increased rate. More importantly, when the stand is left unattended, it can be vandalized or stolen.

Portable deer stands have been devised so that the hunter can haul an assembled or nearly completed assembled deer stand to the hunting site for assembly and use within a matter of minutes. However, these devices still remain large and bulky and are difficult to transport into steep or rugged terrain or into densely wooded areas.

The present invention provides a portable and compact deer stand that can be transported safely by a transport vehicle into remote locations and erected in minimal time. By providing a compact structure, the stand can be transported to many areas previously unreachable with the prior bulky stands. Furthermore, compact configurations provide a safer alternative to prior stand designs when transporting through steep, rugged or densely wooded terrain.

SUMMARY OF THE INVENTION

The present invention provides a portable deer stand that can be transported to and from hunting locations using a transport vehicle. When fully assembled, an elevated hunting platform is supported by a ladder and at least two support legs. The device can be fully assembled within a short period of time and without using tools. During transport to and from the hunting location, the hunting platform is lowered, the ladder is folded and the support legs are mounted in a storage position so that the stand is compact for safe transportation.

When the hunter arrives at the desired location and is ready to erect the stand, the ladder is extended from a folded position to an extended position. The legs are removed from the storage position and are inserted into the leg guides where the legs are locked into position to prevent separation. After the legs and ladder are positioned, a cable is connected from a hand-operated winch to the ladder so that as the winch is turned, a sufficient force is exerted on the ladder to raise and rotate the portable deer stand from the transport position to the hunting position. Once the stand is in the hunting position, the legs and ladder can be adjusted in length to conform to uneven terrain allowing the hunter platform to remain parallel with respect to the horizon. The hunting device can remain attached to the transport vehicle to provide additional stabilization, or optionally, the hunting device can be separated so that the transport vehicle can be driven away.

BRIEF DESCRIPTION OF THE DRAWINGS

For a more complete understanding of the invention and for further advantages thereof, reference is now made the following Description of the Preferred Embodiments taken in conjunction with the accompanying drawings in which:

FIG. 2 is a side elevation view of the portable deer stand showing the stand attached to the transport vehicle and in the transport position.

FIGS. 3a–3c are a perspective view illustrating the connector mechanism between the ladder bottom portion and the ladder top portion while the ladder is being extended into the extended position as shown in FIG. 3.

FIG. 4 is a side elevation view of the present deer stand illustrating the legs connected to the stand and winch assembly prior to raising the stand to the hunting position.

FIG. 4a is a perspective view illustrating the locking mechanism for connecting the leg and the leg guide, as best seen in FIG. 4.

FIG. 4b is a perspective view illustrating the locking pin to permit the legs to be adjusted to adapt the stand to uneven terrain.

DESCRIPTION OF THE PREFERRED EMBODIMENTS

Figure 1:
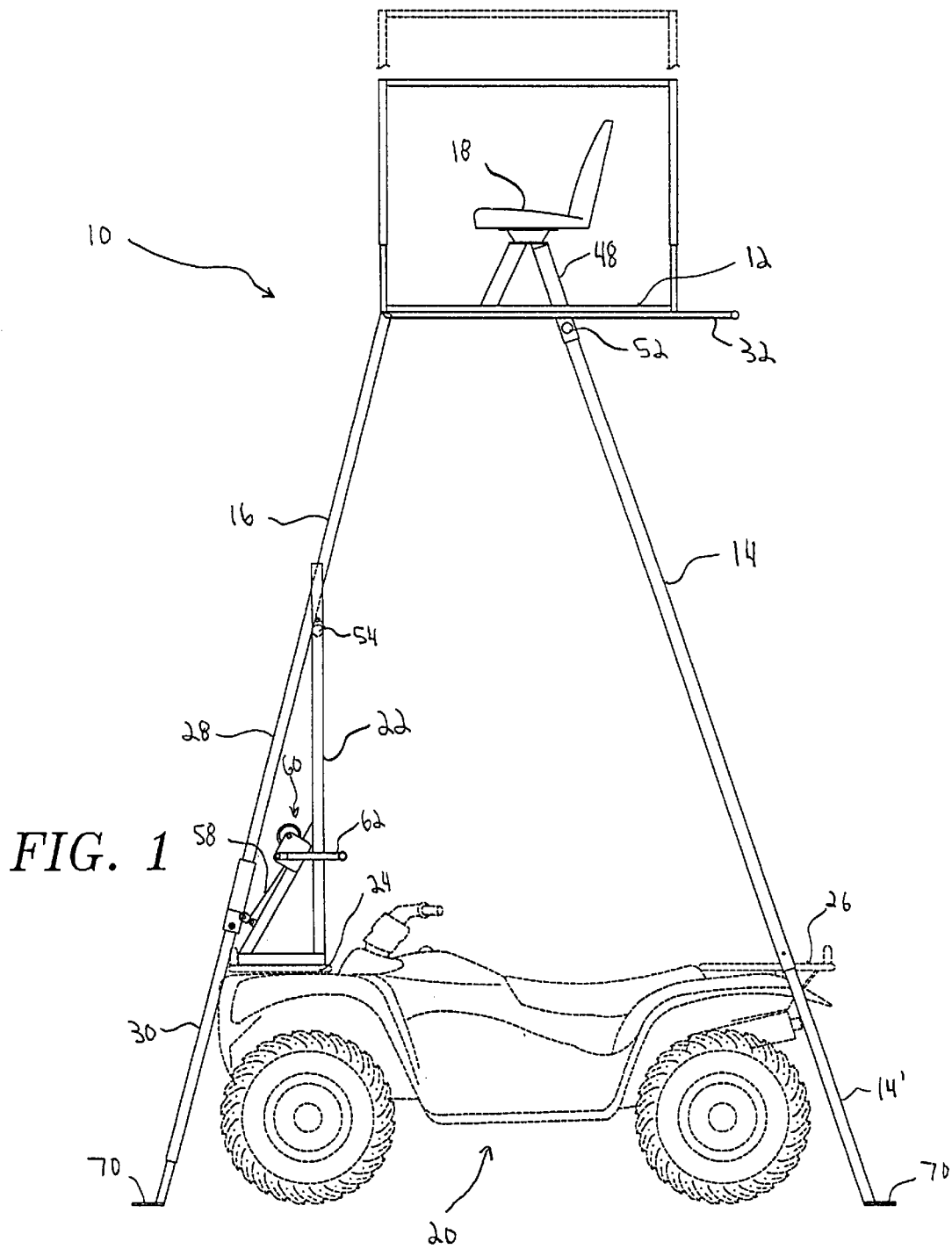
FIG. 1 is a side elevation view of the portable deer stand of the present invention showing the stand attached to a transport vehicle and in the hunting position.
Figure 5A:
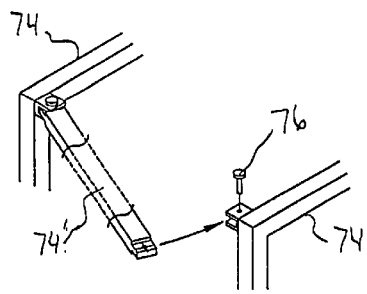
FIG. 5a is a perspective view of the platform enclosure.
Figure 5:
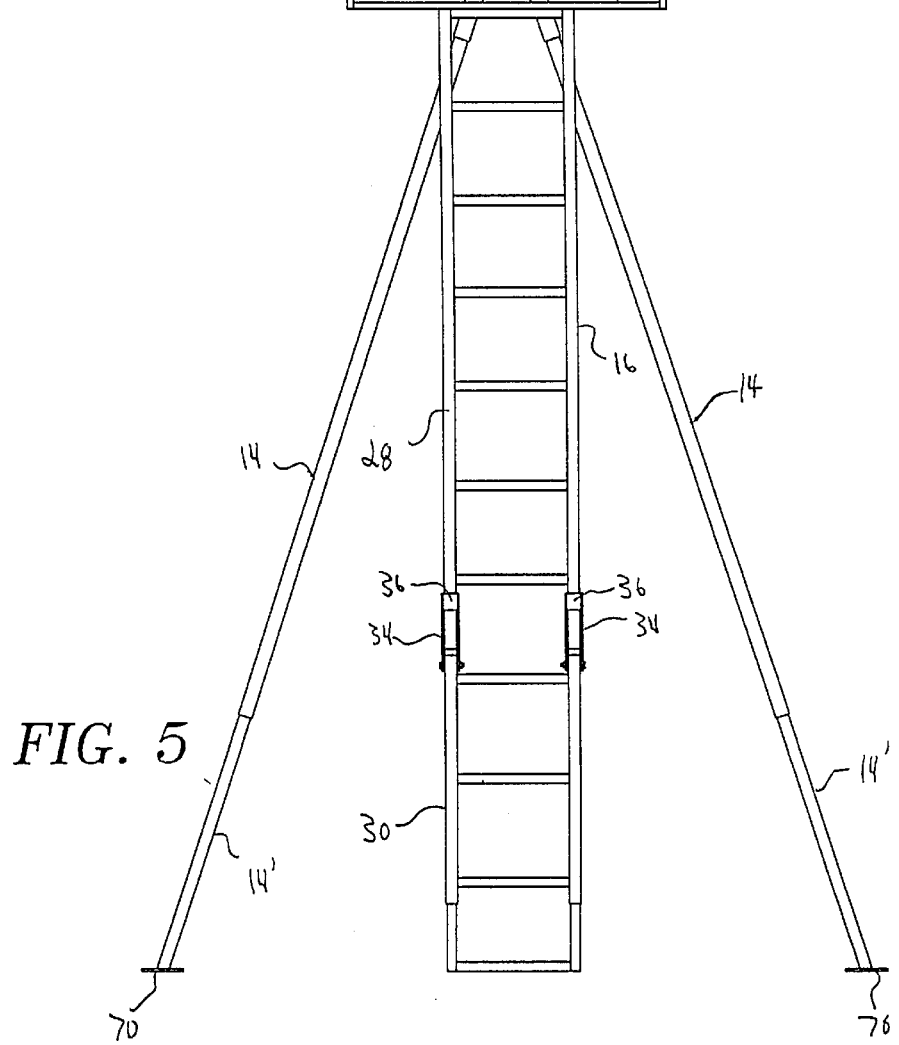
FIG. 5 is a front elevation view of the portable deer stand in the hunting position without the transport vehicle attached thereto.

Referring to FIGS. 1 and 5, the present invention provides a portable hunting device or stand generally identified by the numeral 10 including a hunter platform 12, legs 14, ladder 16 and a seat 18. As seen in FIG. 1, device 10 is erected in a hunting position so that platform 12 is generally horizontal to elevate a hunter while sitting in chair 18. Once device 10 is in the hunting position, portable device 10 can be partially supported by a transport vehicle 20 which contains a support 22 connected to a front rack 24. Because device 10 is sufficiently stable and supported by legs 14 and ladder 16, device 10 can optionally be separated from support 22 as shown in FIG. 5 allowing transport vehicle 20 to be driven away. Transport vehicle 20 can be any type of vehicle used in off-road conditions such as a truck, tractor, trailer, four wheeler, etc. Additionally, the present device 10 can be transported on a non-motorized vehicle which is pulled by another vehicle.

Referring to FIG. 2, hunting device 10 is shown in a transport position where ladder 16 is horizontally positioned on support 22 and platform 12 is lowered and supported on a rear rack 26. While in the transport position, ladder 16 is disassembled to form a top portion 28 and a bottom portion 30 where the top portion is generally parallel with respect to vehicle 20 and the bottom portion is folded and attached to support 22. As seen in FIG. 2, when ladder 16 is folded and in the transport position, device 10 is compact to necessitate safe transportation to and from the hunting area.

Support 22 is attached to front rack 24 of transport vehicle 20 preferably by using ratchet straps (not shown) so that no bolts are required. However, support 22 can be attached to transport vehicle 20 by bolting, welding or the like if permanent attachment is desired. Support 22 can also be mounted to rear rack 26 of vehicle 20. Platform 12 is supported on rear rack 26 by stand extension 32. The length of extension 32 can be adjusted to maintain horizontal positioning of ladder top portion 28 with respect to transport vehicle 20 in order to adapt to varying sized transport vehicles 20.

Figure 3:
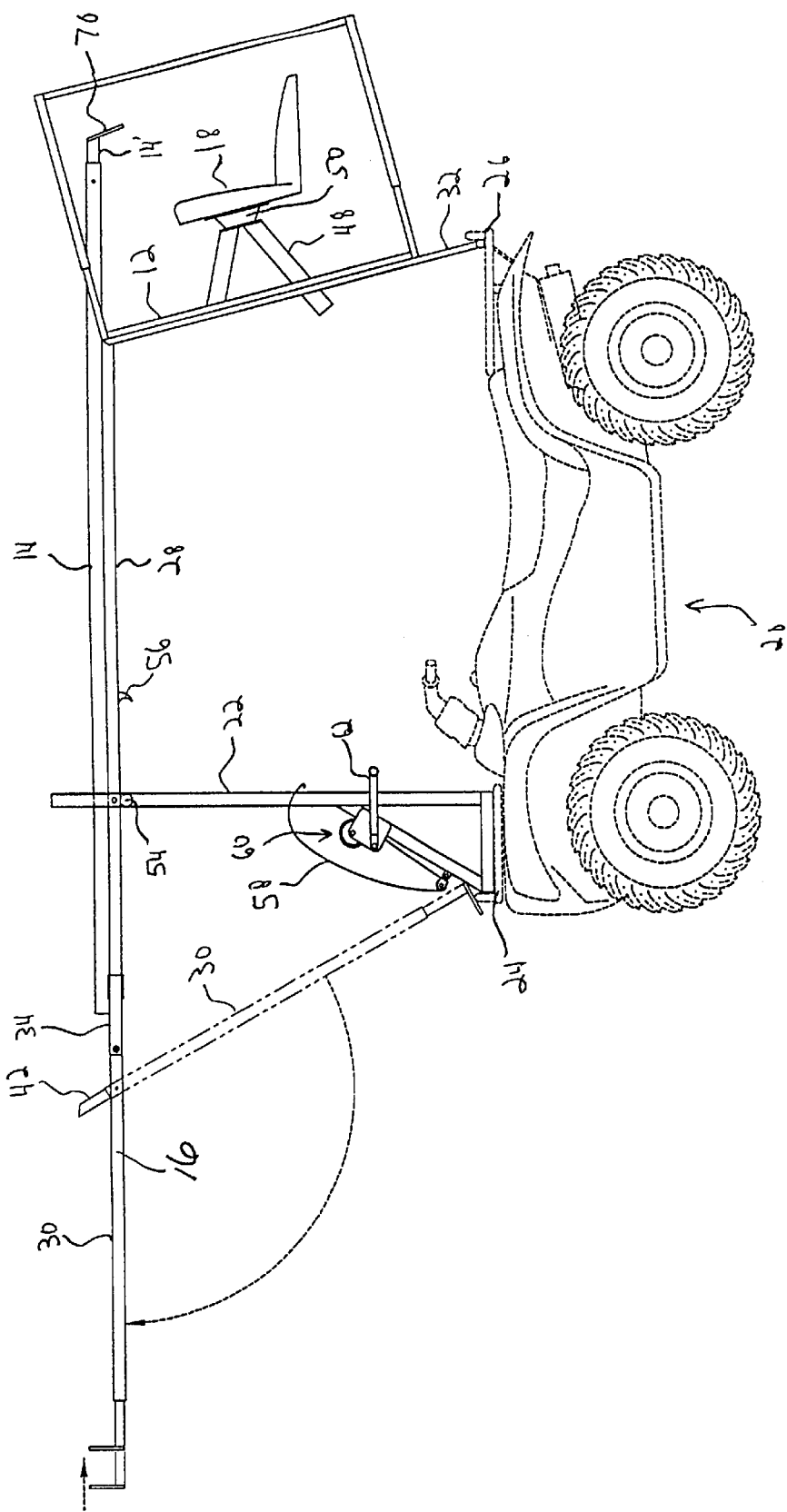
FIG. 3 is a side elevation view of the portable deer stand showing the stand attached to the transport vehicle and the ladder bottom portion being rotated from the folded position to the extended position.

Referring to FIG. 3, assembly of device 20 from the transport position (FIG. 2) to the hunting position (FIG. 1) is performed by placing ladder 16 in the extended position so that ladder bottom portion 30 is aligned with ladder top portion 28. Referring to FIGS. 3a–3c, bottom portion 30 of ladder 16 is aligned and connected with top portion 28 by a connector mechanism 34 which contains a sleeve 36 on the first end to slidably engage ladder top portion 28 and a fork 38 on the second end to pivotably connect bottom portion 30 to connector mechanism 34. Alignment of ladder bottom portion 30 with top portion 28 is performed by mating sleeve 36 with a raised end or shoulder 40 of top portion 28 so that bottom portion 30 is fully separated from top portion 28. Next, bottom portion 30 is rotated so that a telescoping extension 42 is aligned with opening 44 on ladder top portion 28 (FIG. 3a). Ladder bottom portion 30 is then pushed toward top portion 28 indicated by arrow $P_1$ (FIG. 3b) so that extension 42 is inserted inside opening 44 of ladder top portion 28 until a flat surface 46 mates with shoulder 40 (FIG. 3c).

Once ladder bottom portion 30 is assembled, legs 14 are removed from the storage position, located above and resting on top of ladder top portion 28 (FIGS. 2 & 3), and are aligned and inserted inside leg guides 48. Leg guides 48 are hollow extensions permanently attached to a seat mounting bracket 50. After inserting legs 14 into leg guides 48, a locking mechanism 52, preferably a locking screw, as seen in FIG. 4a, is turned until the screw frictionally engages with legs 14. Mechanism 52 prevents separation of leg 14 from leg guide 48. Other attachment mechanisms can be used, such as a rod and cotter pin assembly (not shown), for example.

Referring to FIG. 4, prior to rotating device 10 from the transport position to the hunting position, ladder 16 is pushed so that it slides on bearings 54 in the direction of arrow $P_2$ until catch mechanisms 56 (best seen in FIG. 3) are adjacent bearings 54, as seen in FIG. 4. Bearings 54 freely rotate not only to allow ladder 16 to easily slide forward but also to act as a pivot point so that ladder 16 can be rotated to place device 10 in the hunting position.

In order to rotate device 10 to the hunting position, a first end of cable 58 is attached to ladder bottom portion 30 and the opposite end of cable 58 is attached to a rotation mechanism 60. Rotation mechanism 60 is preferably a hand-operated winch so that upon rotation of a handle 62 cable 58 pulls downward to rotate ladder 16 in the direction of arrow P3. This motion raises platform 12 from the transport position (FIG. 2) to the hunting position (FIG. 1). It should be understood that rotation mechanism 60 can also be driven by an electrical motor or the like. Once in the hunting position, legs 14 and ladder 16 can be adjusted in length to maintain platform 12 in parallel relation to the horizon when the device 10 is located on uneven terrain. As seen in FIG. 4b, legs 14 contains telescoping extensions 14' having multiply spaced openings 64 that are aligned with openings 66 so that a locking pin 68 can be inserted inside the aligned openings to establish and maintain the desired length of legs 14. Furthermore, leg extensions 14' contain a flat plate 70 to stabilize the device while in the hunting position. Each flat plate 70 includes an opening 72 to permit a stake (not shown) to be inserted to provide additional stabilization. Additionally, ladder 16 also contains a flat plate 70 and opening 72 (not shown) to provide additional stability for ladder 16.

Referring to FIG. 5 portable hunting device 10 is separated from transport vehicle 20 and fully supported by legs 14 and ladder 16. Device 10 is separated by detaching cable 58 from the ladder 16 and applying an upward force on ladder 16 to separate catch 56 from bearing 54 (FIG.1). Once separated, transport vehicle 20 can be driven away from device 10. In the embodiment shown, device 10 comprises two legs 14 and ladder 16 so that a hunter can be supported while on the platform 12. A greater number of legs can be utilized to enhance stability of the device while in the hunting position.

Referring to FIGS. 5 and 5a, during use, a hunter climbs ladder 16 to enter platform 12. A rail 74 surrounds platform 12 and chair 18 to prevent the hunter from falling off the platform during use. Upon reaching the top portion of the ladder, rail 74' can be pivoted by removing pin 76 to provide an entrance or opening to platform 12, as best seen in FIG. 5a. Once the hunter is on platform 12, rail 74' is returned to the closed position (FIG. 5) and pin 76 is reinserted into the opening to prevent rail 74' from opening. Referring back to FIG. 1, the height of rail 74 can be adjusted to provide a taller enclosure and better prevent the hunter from falling off the device 10 while also providing support for a hunter's rifle. Furthermore, chair 18 can swivel 360 degrees to allow the hunter to visually observe the surrounding area without having to stand on platform 12.

When it is desired to disassemble the device 10 for transport, the device is easily placed in the transport position in minimal time. If device 10 is separated from transport vehicle 20, the vehicle 20 must be oriented so that bearings 54 on support 22 are aligned and adjacent to catch members 56. The ladder 16 is manually lifted so that catch members 56 are placed on bearings 54. Cable 58 is then attached to ladder 16 and any slack in the line is removed with winch 60. When ladder 16 is attached to support 22 and slack in cable 58 is removed, legs 14 are shortened to provide a sufficient clearance distance between leg flat plates 70 and the ground to allow rotation of device 10. At this point, winch 60 holds device 10 in the hunting position. Winch 60 is then released to control the rate at which the ladder 16 rotates and platform 12 lowers. The 10 stand is gradually lowered using winch 60 until extension 32 rests on rack 26. At this position legs 14 are removed and returned to the storage position (FIG. 2). Device 10 is slid rearward on bearings 54 and ladder bottom portion 30 is folded and locked to support 22 to provide a compact device 10 for safe transportation.

Portable hunting device 10 can be constructed of any material suitable to support the weight of at least one hunter. Such materials can include steel or wood by way of example.

Although the preferred embodiments of the present invention have been illustrated in the accompanying drawings and described in the foregoing Description of the Preferred Embodiments, it will be understood that the invention is not limited to the embodiments disclosed but is capable of numerous rearrangements, modifications and substitutions of parts and elements without departing from the spirit and scope of the invention.

We claim:

1. A portable hunting device for supporting a hunter above ground surface comprising a transport vehicle;

a platform for supporting the hunter;

first and second legs for supporting said platform;

means on said transport vehicle for supporting said first and second legs;

a ladder;

means connecting a top end of said ladder to said platform;

support means carried by said transport vehicle to support said ladder above said transport vehicle, said support means including pivot means engaging said ladder, and said ladder being pivotal on said pivot means to position a bottom end of said ladder to engage the ground and to move said ladder off said pivot means;

means for securing ends of said legs to said ladder whereby pivoting of said ladder moves other ends of said legs into said ground engaging position and lifting of said ladder off said pivot means separates said ladder from said support means carried by said transport vehicle to support said ladder.

2. A portable hunting device as in claim 1, wherein the pivot means further comprises bearings on the support means carried by said transport vehicle to support the ladder on which the ladder is moved lengthwise relative to the support vehicle and catch mechanisms on said ladder to engage said bearings during pivoting of said ladder.

3. A portable hunting device as in claim 1, further including means carried by the transport vehicle to pivot the ladder about the pivot means and to position the bottom end of said ladder in ground engaging position.

4. A portable hunting device as in claim 3, wherein the means carried by the transport vehicle to pivot the ladder is a winch with a cable and attachment means for releasably attaching said cable to said ladder.

5. A portable hunting device as in claim 1, wherein the bottom end of the ladder is foldable into engagement with the transport vehicle when the ladder is positioned above the transport vehicle and means on the transport vehicle to secure the bottom of the ladder thereto.

6. A portable hunting device as in claim 2, further including means for releasably securing said platform to said transport vehicle.

7. A portable hunting device as in claim 6, further including means carried by the transport vehicle to pivot the ladder about the pivot means and to position the bottom end of said ladder in ground engaging position.

8. A portable hunting device as in claim 7, wherein the means carried by the transport vehicle to pivot the ladder is a winch with a cable and attachment means for releasably attaching said cable to said ladder.

9. A portable hunting device as in claim 8, wherein the bottom end of the ladder is foldable into engagement with the transport vehicle when the ladder is positioned above the transport vehicle and means on the transport vehicle to secure the bottom of the ladder thereto.

* * * * *